(12) United States Patent
Parsa et al.

(10) Patent No.: US 11,336,189 B2
(45) Date of Patent: May 17, 2022

(54) DUAL-CAPACITOR RESONANT CIRCUIT FOR USE WITH QUASI-RESONANT ZERO-CURRENT-SWITCHING DC-DC CONVERTERS

(71) Applicants: The Regents of the University of California, Oakland, CA (US); Rensselaer Polytechnic Institute, Troy, NY (US)

(72) Inventors: Leila Parsa, Santa Cruz, CA (US); Rohit Suryadevara, Brown Deer, WI (US)

(*) Notice: Subject to any disclaimer, the term of this patent is extended or adjusted under 35 U.S.C. 154(b) by 0 days.

(21) Appl. No.: 16/846,015

(22) Filed: Apr. 10, 2020

(65) Prior Publication Data

US 2020/0328678 A1 Oct. 15, 2020

Related U.S. Application Data

(60) Provisional application No. 62/832,513, filed on Apr. 11, 2019.

(51) Int. Cl.
*H02M 3/335* (2006.01)
*H02M 3/00* (2006.01)
*H02M 3/156* (2006.01)
*H02M 1/08* (2006.01)
*H02M 3/07* (2006.01)

(52) U.S. Cl.
CPC ......... *H02M 3/33573* (2021.05); *H02M 3/01* (2021.05); *H02M 1/083* (2013.01); *H02M 3/07* (2013.01); *H02M 3/156* (2013.01)

(58) Field of Classification Search
CPC ...... H02M 3/01; H02M 1/0058; H02M 1/083; H02M 1/4241; H02M 3/33573

USPC ....................................................... 363/21.02
See application file for complete search history.

(56) References Cited

U.S. PATENT DOCUMENTS

| | | | | |
|---|---|---|---|---|
| 6,314,002 | B1 * | 11/2001 | Qian ................. | H02M 3/33538 363/21.04 |
| 6,317,341 | B1 * | 11/2001 | Fraidlin ............ | H02M 3/33569 363/56.09 |
| 9,263,960 | B2 | 2/2016 | Jovanovi et al. | |
| 9,331,584 | B2 | 5/2016 | Ohtake | |
| 9,653,985 | B2 | 5/2017 | Xu et al. | |
| 2001/0036087 | A1 * | 11/2001 | Raets ................ | H02M 3/33561 363/17 |

(Continued)

FOREIGN PATENT DOCUMENTS

| | | |
|---|---|---|
| CN | 106558994 A | 4/2017 |
| CN | 108736725 A | 11/2018 |

(Continued)

*Primary Examiner* — Alex Torres-Rivera
(74) *Attorney, Agent, or Firm* — Carter, DeLuca & Farrell LLP

(57) ABSTRACT

A direct current-direct current (DC-DC) converter includes a plurality of switches configured to be coupled to a voltage source. The DC-DC converter also includes a transformer having a primary winding coupled to the plurality of switches and a secondary winding. The DC-DC converter further includes a first capacitor; and a second capacitor, wherein the first capacitor is coupled in series with the primary winding, the second capacitor is coupled in parallel with the secondary winding. The first capacitor, the second capacitor, and a leakage inductance of the transformer form a dual-capacitor resonant circuit.

11 Claims, 4 Drawing Sheets

(56) References Cited

U.S. PATENT DOCUMENTS

| | | | |
|---|---|---|---|
| 2003/0198064 A1* | 10/2003 | Zhu | H02M 3/33576 363/21.01 |
| 2005/0243579 A1* | 11/2005 | Jang | H02M 3/33546 363/16 |
| 2007/0153553 A1* | 7/2007 | Cebry | H02M 3/33592 363/16 |
| 2009/0290389 A1* | 11/2009 | Ueno | H02M 3/337 363/21.02 |
| 2011/0317450 A1* | 12/2011 | Cheng | H02M 1/4241 363/20 |
| 2014/0334189 A1* | 11/2014 | Yan | H02M 3/33584 363/17 |
| 2015/0303818 A1* | 10/2015 | Lin | H02M 3/33569 363/21.03 |
| 2015/0326133 A1* | 11/2015 | Lin | H02M 3/33569 363/21.02 |
| 2019/0341855 A1* | 11/2019 | Kim | H02M 3/337 |
| 2020/0099311 A1* | 3/2020 | Askarianabyaneh | H02M 1/4258 |
| 2020/0366213 A1* | 11/2020 | Watanabe | H02M 3/33584 |
| 2020/0395856 A1* | 12/2020 | Arafat | H02M 3/337 |

FOREIGN PATENT DOCUMENTS

| | | |
|---|---|---|
| EP | 3425784 A1 | 1/2019 |
| KR | 101435469 B1 | 8/2014 |
| RU | 2564679 C1 | 10/2015 |
| WO | 2014152415 A1 | 9/2014 |

* cited by examiner

DUAL-CAPACITOR RESONANT CIRCUIT FOR USE WITH QUASI-RESONANT ZERO-CURRENT-SWITCHING DC-DC CONVERTERS

CROSS-REFERENCE TO RELATED APPLICATION

This application claims the benefit of and priority to U.S. Patent Provisional Application No. 62/832,513, filed on Apr. 11, 2019. The entire disclosure of the foregoing application is incorporated by reference herein.

BACKGROUND

Renewable energy sources such as solar photovoltaics (PV) and wind turbines are used for clean power generation to address the ever-increasing energy consumption. With large-scale integration of renewables, battery storage becomes essential in the grid to meet supply-demand volatility. In these scenarios, direct current (DC) grids offer multiple benefits over alternating current (AC) grids such as, improved efficiency, controllability, reliability and reduced cost. Isolated voltage step-up DC-DC converters are used for interfacing PV and wind energy sources with DC grids and DC-DC converters are viable options for such applications. Accordingly, there is a need for DC-DC converters which provide for efficient energy transfer.

SUMMARY

The present disclosure provides a full-bridge boost-type DC-DC converter, which achieves zero-current-switching ZCS operation and smooth current commutation by utilizing L-C resonance between leakage inductance of a high-frequency transformer having a primary winding and a secondary winding and a resonant capacitor. The DC-DC converter includes a dual-capacitor resonant circuit having a first capacitor, which is connected in series with the transformer-primary winding and acts as series-resonant capacitor. The dual-capacitor resonant circuit also includes a second capacitor, which is connected in parallel with the secondary winding of the transformer and acts as a shunt-resonant capacitor. Furthermore, the leakage inductance of the transformer acts as an inductor forming and inductor-capacitor (L-C) circuit with the first capacitor (i.e., the series-resonant capacitor). The first capacitor stores adaptive resonant energy, which is dependent on the input current and the second capacitor stores fixed resonant energy under all operating conditions. The second capacitor is configured to store a portion of rated resonant energy and may also be used as a design parameter to adjust the overall resonant impedance of the L-C resonant circuit.

The DC-DC converter with the dual-capacitor resonant circuit according to the present disclosure provides a number of benefits over converter designs, which include only a shunt-resonant capacitor. Such converter designs require a dedicated charging interval in every switching half-cycle, which does not contribute towards energy transfer and results in duty-cycle loss. Since the shunt-resonant capacitor is designed to hold resonant energy sufficient for a rated current condition, resonant energy is fixed for all loading conditions. At reduced loading, reduced resonant energy is sufficient but shunt-configuration has no means to achieve this control. Although this may be mitigated by using two additional switches, this arrangement leads to increased losses and cost. At reduced loading, duty-cycle loss increases significantly because the reduced current results in longer capacitor charging time. This severely restricts the operation range of converter. Smooth current commutation and ZCS are also lost at overload conditions since the capacitor is designed for rated-current condition. Shunt-resonant capacitor is expected to hold its voltage/energy during the operating mode when input inductor charges. However, a leakage path exists through the transformer winding parasitics, which results in capacitor discharge. As a result, the capacitor energy must be overrated to compensate for this loss, which further aggravates all of the aforementioned issues.

The DC-DC converter with the dual-capacitor resonant circuit according to the present disclosure also provides a number of benefits over converter designs which include only a series-resonant capacitor, such converter designs require precise control of resonant energy, which can be achieved only by using additional switches. However, this arrangement leads to increased losses and cost. To satisfy the resonant condition, the series-resonant capacitor must also be charged to a voltage higher than the reflected voltage across the transformer-primary. Peak voltage-rating of primary-side components (e.g., switches and input inductor) is also increased. Series-resonant capacitor also transfers energy to the output during the time interval when resonant current commutation occurs, which requires using capacitors having a higher rating. At reduced loading, the series-resonant capacitor does not have enough voltage to satisfy the resonant condition. Switching frequency may be used as an additional control parameter without using extra switches. Reduction in switching frequency results in increased charging time and hence, higher voltage. However, ripple content increases and requires larger filters due to varying switching frequency.

According to one embodiment of the present disclosure, a direct current-direct current (DC-DC) converter is disclosed. The DC-DC converter includes a plurality of switches configured to be coupled to a voltage source. The DC-DC converter also includes a transformer having a primary winding coupled to the plurality of switches and a secondary winding. The DC-DC converter further includes a first capacitor; and a second capacitor, wherein the first capacitor is coupled in series with the primary winding, the second capacitor is coupled in parallel with the secondary winding. The first capacitor, the second capacitor, and a leakage inductance of the transformer form a dual-capacitor resonant circuit.

According to one aspect of the above embodiment, the plurality of switches are arranged in a full-bridge circuit topology. Each of the plurality of switches is a transistor, which may be a field-effect transistor, a metal-oxide semiconductor field-effect transistor, or an insulated-gate bipolar transistor. Each of the plurality of switches is also coupled in series to a diode.

According to another aspect of the above embodiment, the DC-DC converter further includes an input inductor coupled in series with the voltage source. The input inductor is configured to act as a constant current source.

According to a further aspect of the above embodiment, the first capacitor is configured to store adaptive resonant energy, which is dependent on an input current from the input inductor. The second capacitor is a shunt-resonant capacitor and is configured to store a portion of resonant energy of the dual-capacitor resonant circuit.

According to yet another aspect of the above embodiment, the DC-DC converter further includes a voltage double rectifier having a first output diode and a second output diode. The voltage double rectifier further includes a first output capacitor and a second output capacitor.

According to another embodiment of the present disclosure, a method for operating a direct current-direct current (DC-DC) converter is disclosed. The method includes activating a first switch and a fourth switch of a full-bridge circuit during a first mode of an operational cycle of the DC-DC converter. The full-bridge circuit is coupled to a voltage source. The method further includes turning on a first output diode to transfer energy from the voltage source to a load during the first mode. The method further includes clamping a first capacitor coupled in series with a primary winding of a transformer coupled to the full-bridge circuit; charging a second capacitor coupled in parallel with a secondary winding of the transformer; and activating a second switch and a third switch of the full-bridge circuit during a second mode of the operational cycle of the DC-DC converter. The method further includes charging an input inductor during a third mode of the operational cycle of the DC-DC converter. The input inductor being is coupled in series with the full-bridge circuit and the voltage source. During the third mode the first capacitor, the second capacitor, and a leakage inductance of the transformer are resonant. The method further includes turning on a second output diode to transfer energy from the voltage source to a load during a fourth mode.

According to an aspect of the above embodiment, each of the switches is a transistor, which may be a field-effect transistor, a metal-oxide semiconductor field-effect transistor, and an insulated-gate bipolar transistor. Each of switches is coupled in series to a diode.

According to another aspect of the above embodiment, the input inductor is a constant current source.

According to a further aspect of the above embodiment, the first capacitor, the second capacitor, and the leakage inductance of the transformer form a dual-capacitor resonant circuit. The second capacitor is a shunt-resonant capacitor and is configured to store a portion of resonant energy of the dual-capacitor resonant circuit.

BRIEF DESCRIPTION OF DRAWINGS

Various embodiments of the present disclosure will be described herein below with reference to the figures wherein.

DETAILED DESCRIPTION

Figure 1:
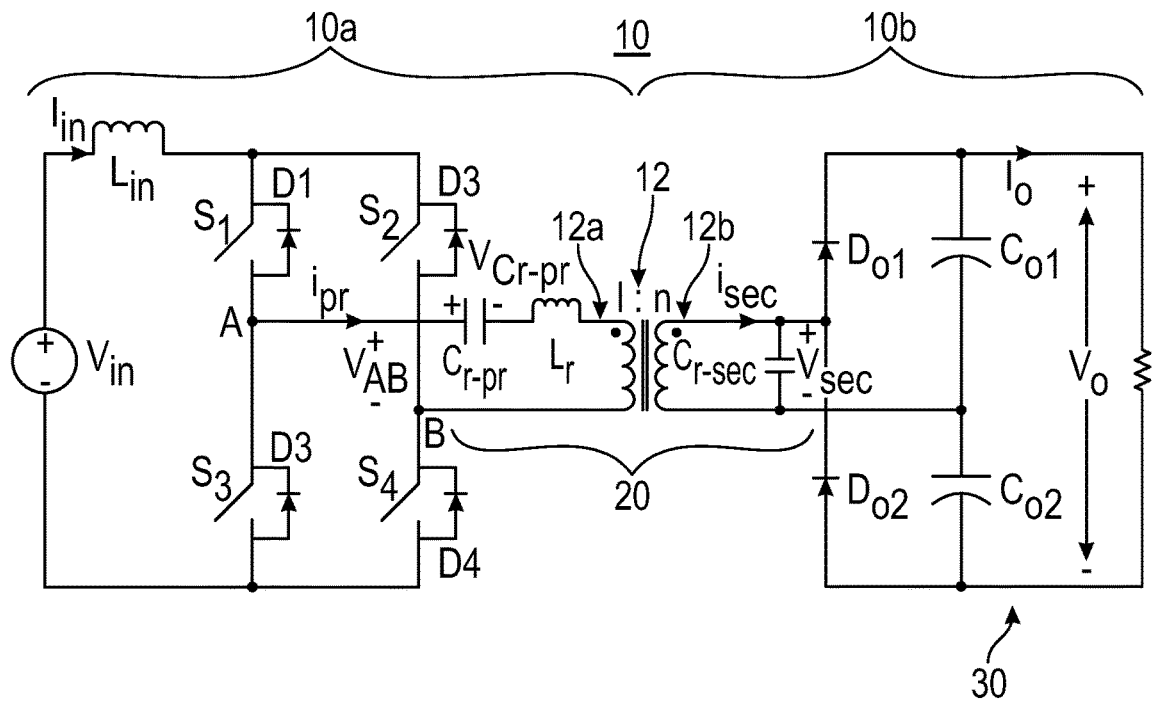
FIG. 1 is an electrical schematic diagram of a DC-DC converter having a dual-capacitor resonant circuit according to an embodiment to the present disclosure.
Figure 2:
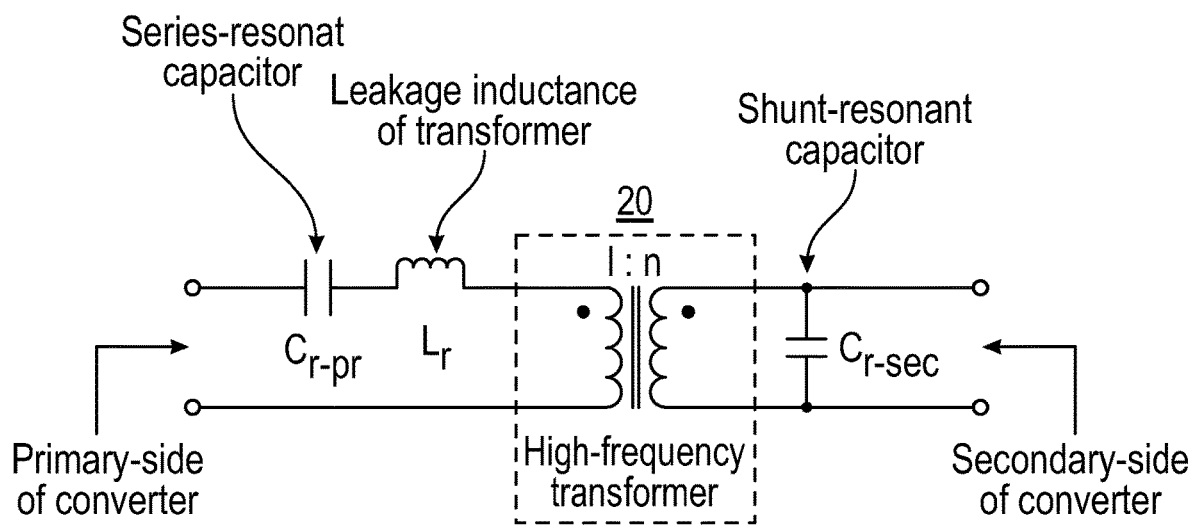
FIG. 2 is an electrical schematic diagram of the dual-capacitor resonant circuit of FIG. 1.

With reference to FIG. 1, a DC-DC converter 10 having a primary (i.e., input) side 10a and a secondary (i.e., output) side 10b. The DC-DC converter 10 also includes a dual-capacitor resonant circuit 20 (FIG. 2). The DC-DC converter 10 further includes a first switch S1, a second switch S2, a third switch S3, and a fourth switch S4. The switches S1-S4 are disposed on the primary side 10a and are arranged in a full bridge circuit topology. Each of the switches S1-S4 also includes a series diode D1-D4 coupled thereto, respectively. The switches S1-S4 may be any suitable field-effect transistor (FET) such metal-oxide semiconductor field-effect transistor (MOSFET) or insulated-gate bipolar transistor (IGBT). The switches S1-S4 are coupled to a voltage source $V_{in}$ through an input inductor $L_{in}$, coupled in series with voltage source $V_{in}$. The input inductor $L_{in}$ acts as a constant current source feeding switches S1-S4.

The DC-DC converter 10 also includes a transformer 12 having a primary winding 12a coupled to the switches S1-S4 and a secondary winding 12b. The transformer 12 may be a high-frequency transformer and provides galvanic isolation between the primary side 10a and the secondary side 10b. The transformer 12 has a turns-ratio of the secondary winding 12b to the primary winding 12a of n. Transformer leakage inductance $L_r$ of the transformer 12 also forms an L-C resonant circuit with resonant capacitors $C_{r-pr}$ and $C_{r-sec}$, assisting in smooth current transition and zero-current switching (ZCS) of the switches S1-S4.

Series capacitor $C_{r-pr}$ is charged when input current $I_{in}$ from the voltage source $V_{in}$ flows from the primary side 10a to the secondary side 10b. Higher $I_{in}$ charges the capacitor $C_{r-pr}$ to a higher voltage resulting in higher resonant energy and vice-versa. Therefore, adaptive resonant energy is achieved without using any additional switches or a complex control strategy. Proposed converter also maintains ZCS operation under overload conditions due to adaptive energy stored in the capacitor $C_{r-pr}$.

The capacitor $C_{r-sec}$ is coupled in parallel with the secondary winding 12b of the transformer 12 and acts as a shunt capacitor. The capacitor $C_{r-sec}$ is configured to store fixed resonant energy and may be rated for light-load conditions, in contrast to existing converters where full-load-rated energy is stored. This reduces the duty-cycle loss as charging time of the capacitor $C_{r-sec}$ is significantly reduced. The capacitor $C_{r-sec}$ also maintains the total equivalent capacitance for achieving ZCS. Since the required value of the capacitor $C_{r-sec}$ is small, the parasitic capacitance of the primary and secondary windings 12a, 12b and output diodes $D_{o1}$ and $D_{o2}$ can be utilized.

Secondary side 10b of the DC-DC converter 10 includes a voltage doubler rectifier 30. The voltage doubler rectifier 30 includes output diodes $D_{o1}$ and $D_{o2}$ and output capacitors $C_{o1}$ $C_{o2}$ coupled to the secondary winding 12b. The voltage doubler rectifier 30 is coupled to a load and reduces the reflected voltage across transformer-primary from $V_o/n$ to $V_o/2n$. This results in reduction of voltage stress across the primary winding 12a, the secondary winding 12b, the switches S1-S4, and the input inductor $L_{in}$ by approximately 50%. Output diodes $D_{o1}$ and $D_{o2}$ also experience zero-voltage switching (ZVS) turn-on and ZCS turn-off.

The switches S1-S4 may be controlled by a pulse-width modulated (PWM) signal which has a plurality of repeating time periods, T, denoting a complete operational cycle. In embodiments, the PWM signal may be a constant on time with variable switching frequency signal. With reference to FIGS. 3-6, operation of the DC-DC converter 10 is described during half of an operational cycle (i.e., T/2) of the switches S1-S4. In addition, FIG. 7 illustrates a plurality of steady-state waveforms during operation of the DC-DC converter 10. The switches S1 and S4 are switched on-off together. Similarly, the switches S2 and S3 are also switched on-off together. An overlap time is provided to facilitate input inductor charging, current transition and ZCS.

Figure 3:
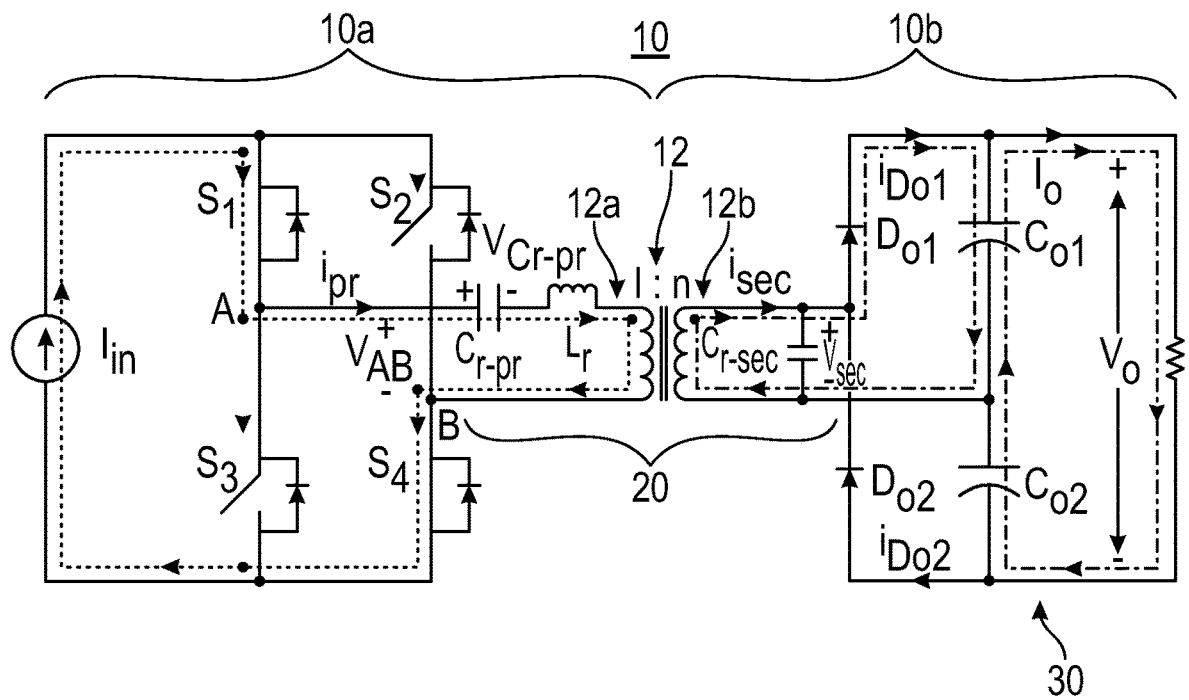
FIGS. 3-6 are electrical schematic diagrams illustrating operational modes of the DC-DC converter of FIG. 1 according to an embodiment of the present disclosure.

With reference to FIG. 3, a first mode of the half of the operational cycle corresponds to energy transfer from the primary side 10a to the secondary side 10b. Switches S1, S4 and diode $D_{o1}$ are on during this mode. Source energy is transferred to the load. The voltage Vsec of capacitor $C_{r\text{-}sec}$ is clamped at $V_0/2$ and the capacitor $C_{r\text{-}pr}$ is charged by current $I_{in}$. The first mode ends at t1 (FIG. 7) when switches S2 and S3 are turned-on.

Figure 4:
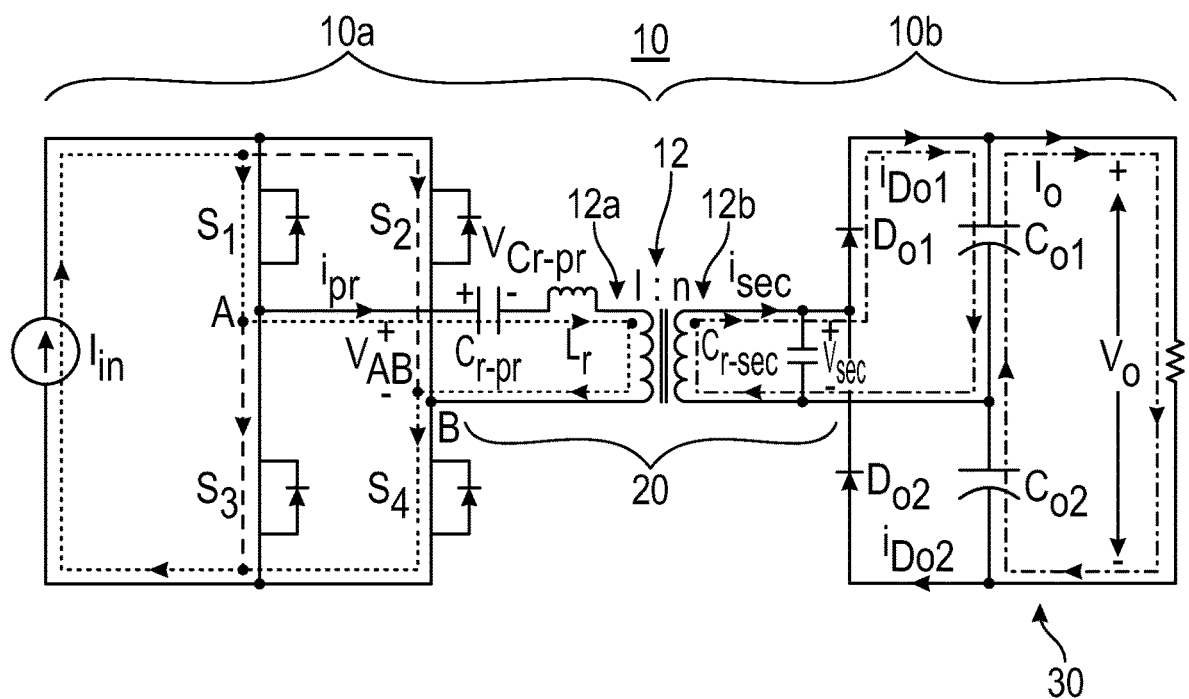

With reference to FIG. 4, a second mode begins at t1 (FIG. 7) when switches S2 and S3 are turned-on, voltage $V_{AB}$ is clamped to zero. Switches S1, S2, S3, S4 and diode $D_{o1}$ are on during this interval. Reflected voltage across the primary winding 12a of the transformer 12, $-V_o/2n$, and voltage of capacitor $C_{r\text{-}pr}$ appear across the transformer leakage inductance $L_r$ and reduce the current $i_{pr}(t)$ to zero by the end of the second mode. Energy stored in transformer leakage inductance $L_r$ is transferred to the secondary winding 12b. Current through S1, S4 starts decreasing and S2, S3 starts increasing, which results in ZCS turn-on of the switches S2, S3.

Figure 5:
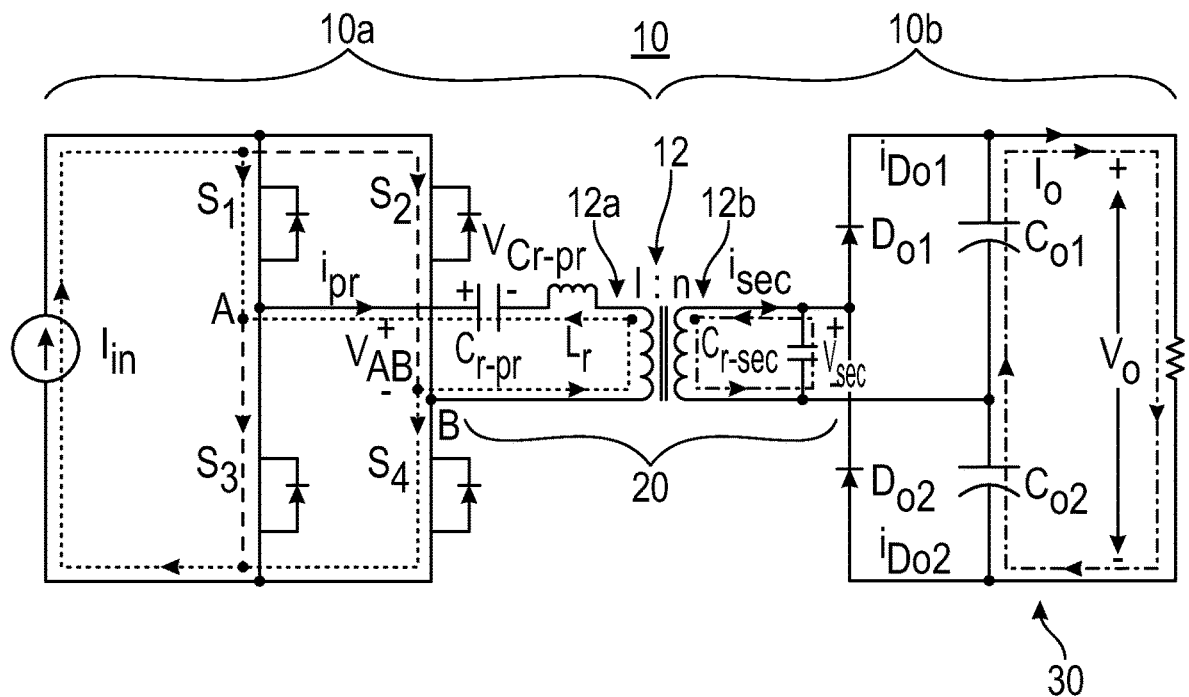

With reference to FIG. 5, during a third mode, input inductor $L_{in}$ is charging and resonant current is transferred. The switches S1-S4 are on during this interval. Because of energy stored in the capacitors $C_{r\text{-}pr}$ and $C_{r\text{-}sec}$, resonance occurs between the capacitors $C_{r\text{-}pr}$ and $C_{r\text{-}sec}$ and transformer leakage inductance $L_r$. This reduces the current in switches S1, S4 and increases the current in the switches S2, S3. Current $i_{pr}(t)$ crosses $-I_{in}$ and reaches its negative peak value. When $i_{pr}(t)$ is equal to $-I_{in}$, the current through S1, S4 reaches zero. As $i_{pr}(t)$ is reduced below $-I_{in}$, the diodes D1, D4 of the switches S1, S4 start conducting. Therefore, the switches S1 and S4 are turned-off during this mode resulting in ZCS. The condition for achieving ZCS turn-off occurs when the magnitude of peak value of $i_{pr}(t)$ is greater than $I_{in}$.

Figure 6:
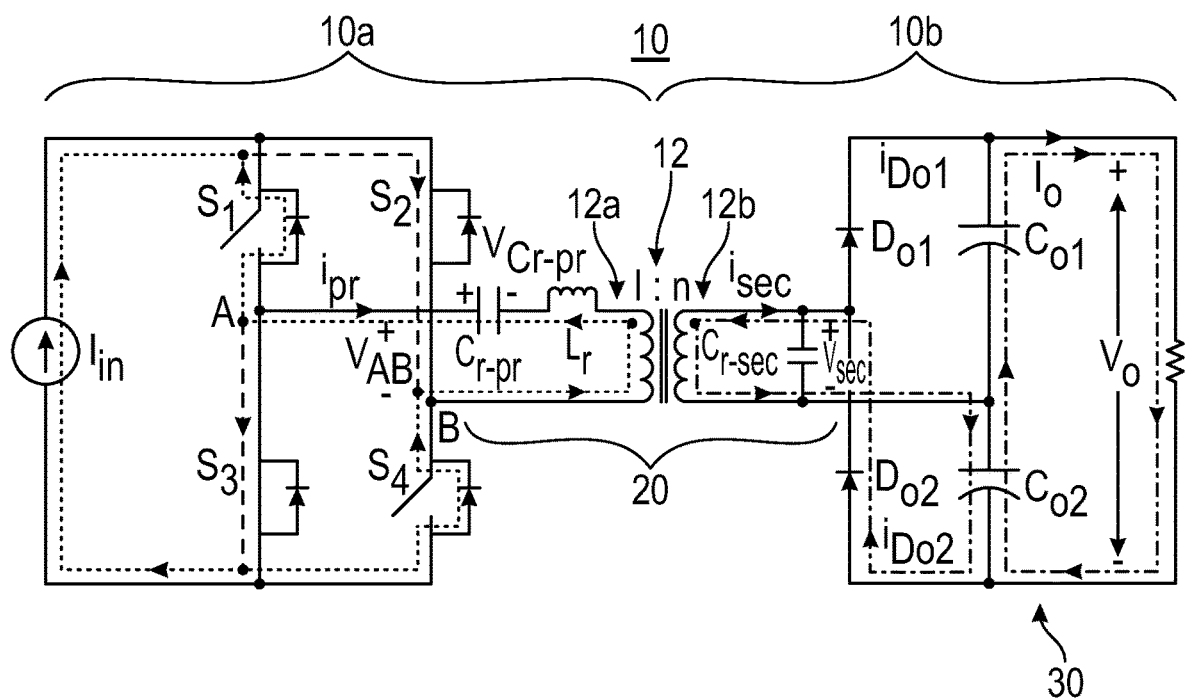
Figure 7:
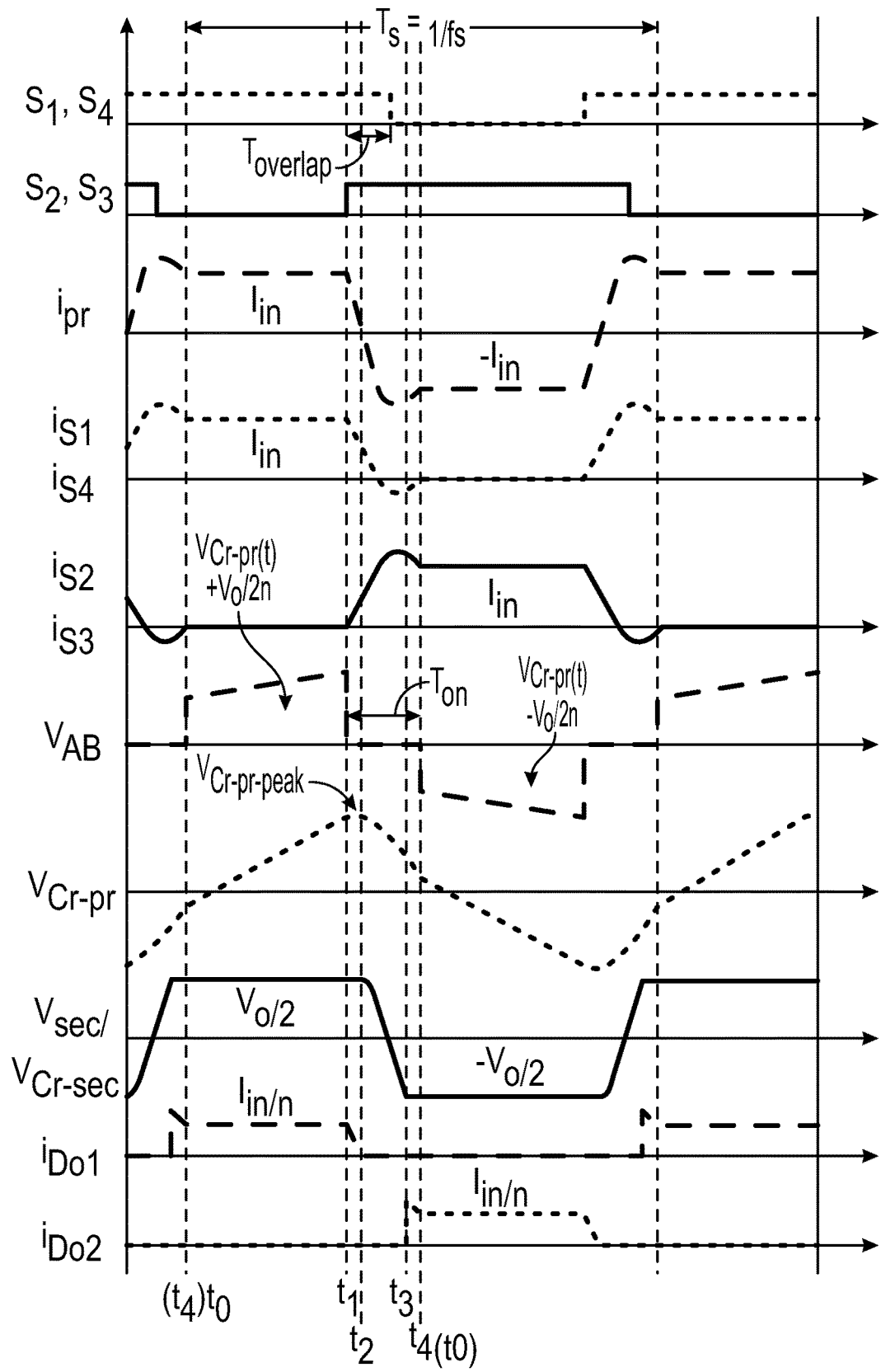
FIG. 7 shows plots of waveforms of the operational modes of FIGS. 3-6 according to an embodiment of the present disclosure.

With reference to FIG. 6, a fourth mode is a continuation of the third mode and ends when the current $i_{pr}(t)$ reaches $-I_{in}$. Since capacitor $C_{r\text{-}sec}$ is charged to $-V_o/2$ at the end of the third mode of FIG. 5, output diode $D_{o2}$ is forward-biased and conducts during the fourth mode. Energy starts flowing from source to load. Subsequent mode of operation is similar to the first mode of FIG. 3 due to symmetry and the modes are repeated during the second half of the operational cycle.

The present disclosure improves on existing solutions for achieving smooth resonant current commutation and ZCS in full-bridge boost-type DC-DC converters. Existing solutions use either a shunt-resonant capacitor or a series-resonant capacitor. Existing solutions also use additional switches or variable switching frequency to achieve adaptive resonant energy.

The DC-DC converter 10 according to the present disclosure uses two dual-resonant capacitors $C_{r\text{-}pr}$ and $C_{r\text{-}sec}$ (i.e., a series capacitor in the primary winding 12a and a shunt capacitor in the secondary winding 12b). The capacitor $C_{r\text{-}pr}$ (i.e., series-resonant capacitor) stores adaptive resonant energy dependent on the input current (converter loading) and the capacitor $C_{r\text{-}sec}$ (i.e., shunt-resonant capacitor) stores fixed resonant energy under all operating conditions. The capacitor $C_{r\text{-}sec}$ is designed to hold only a fraction of rated resonant energy and also used as a design parameter to adjust the overall resonant impedance of the resonant circuit 20.

The DC-DC converter 10 according to the present disclosure provides a number of advantages. Adaptive resonant energy is realized without requiring additional switches or variation in switching frequency. This results in reduced cost, losses and filter requirement. As the capacitor $C_{r\text{-}sec}$ stores only a fraction of rated-resonant energy, duty-cycle loss is reduced, which improves the operation range of DC-DC converter 10. Parasitic winding capacitance (i.e., of the transformer 12) may be utilized as a shunt-resonant capacitor without using additional physical capacitor since a small value may also be sufficient. At reduced loading, the capacitor $C_{r\text{-}pr}$ stores less resonant energy and the capacitor $C_{r\text{-}sec}$ mainly supports the commutation process. At higher loading, the capacitor $C_{r\text{-}pr}$ stores more resonant energy and mainly supports the commutation process. Under overload conditions, smooth current commutation and ZCS are still maintained due to the capacitor $C_{r\text{-}pr}$ adaptively storing higher resonant energy. The capacitor $C_{r\text{-}pr}$ need not be charged to a voltage higher than the reflected voltage across the primary winding 12a of the transformer 12. This reduces the peak-voltage rating when compared to converters using only a series capacitor.

It will be appreciated that of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. A method for operating a direct current-direct current (DC-DC) converter, the method comprising:
   activating a first switch and a fourth switch of a full-bridge circuit during a first mode of an operational cycle of the DC-DC converter, the full-bridge circuit being coupled to a voltage source;
   turning on a first output diode to transfer energy from the voltage source to a load during the first mode;
   clamping a first capacitor coupled in series with a primary winding of a transformer coupled to the full-bridge circuit;
   charging a second capacitor coupled in parallel with a secondary winding of the transformer;
   activating a second switch and a third switch of the full-bridge circuit during a second mode of the operational cycle of the DC-DC converter;
   charging an input inductor during a third mode of the operational cycle of the DC-DC converter, the input inductor being coupled in series with the full-bridge circuit and the voltage source, wherein during the third mode the first capacitor, the second capacitor, and a leakage inductance of the transformer are resonant; and
   turning on a second output diode to transfer energy from the voltage source to a load during a fourth mode.

2. The method according to claim 1, wherein each of the first switch, the second switch, the third switch, and the fourth switch is a transistor selected from the group consisting of a field-effect transistor, a metal-oxide semiconductor field-effect transistor, and an insulated-gate bipolar transistor.

3. The method according to claim 1, wherein the input inductor is a constant current source.

4. The method according to claim 1, wherein each of the first switch, the second switch, the third switch, and the fourth switch is coupled in series to a diode.

5. The method according to claim 1, wherein the first capacitor, the second capacitor, and the leakage inductance of the transformer form a dual-capacitor resonant circuit.

6. The method according to claim 5, wherein the second capacitor is a shunt-resonant capacitor and is configured to store a portion of resonant energy of the dual-capacitor resonant circuit.

7. A direct current-direct current (DC-DC) converter comprising:
  a transformer including:
    a primary winding; and
    a secondary winding coupled to a load;
  a first capacitor coupled in series with the primary winding;
  a second capacitor coupled in parallel with the secondary winding;
  a first output diode;
  a second output diode;
  an input inductor coupled to a voltage source; and
  a full-bridge circuit coupled in series with the input inductor and the primary winding, the full-bridge circuit including a first switch, a second, switch, a third switch, and a fourth switch;
  wherein the full-bridge circuit is configured to operate in:
    a first mode, during which the first switch and the fourth switch are activated, the first output diode is turned on to transfer energy from the voltage source to the load, the first capacitor is clamped, and the second capacitor is charged;
    a second mode, during which the second switch and third switch are activated;
    a third mode, during which the input inductor is charged and the first capacitor, the second capacitor, and a leakage inductance of the transformer are resonant; and
    a fourth mode, during which the second output diode is turned on to transfer energy from the voltage source to the load.

8. The DC-DC converter according to claim 7, wherein the input inductor is a constant current source.

9. The DC-DC converter according to claim 7, wherein each of the plurality of switches is a transistor selected from the group consisting of a field-effect transistor, a metal-oxide semiconductor field-effect transistor, and an insulated-gate bipolar transistor.

10. The DC-DC converter according to claim 7, wherein the first capacitor, the second capacitor, and the leakage inductance of the transformer form a dual-capacitor resonant circuit.

11. The DC-DC converter according to claim 10, wherein the second capacitor is a shunt-resonant capacitor and is configured to store a portion of resonant energy of the dual-capacitor resonant circuit.

* * * * *